United States Patent
Fullerton et al.

(10) Patent No.: US 7,529,065 B2
(45) Date of Patent: May 5, 2009

(54) LAMINATED MAGNETIC THIN FILMS WITH WEAK ANTIFERROMAGNETIC COUPLING FOR PERPENDICULAR MAGNETIC RECORDING

(75) Inventors: Eric Edward Fullerton, Morgan Hill, CA (US); Olav Hellwig, Berlin (DE); Byron Hassberg Lengsfield, III, Gilroy, CA (US); David T. Margulies, Salinas, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 504 days.

(21) Appl. No.: 11/134,746

(22) Filed: May 19, 2005

(65) Prior Publication Data

US 2006/0263643 A1 Nov. 23, 2006

(51) Int. Cl.
   *G11B 5/66* (2006.01)
(52) U.S. Cl. .................... 360/131; 428/828; 428/828.1
(58) Field of Classification Search ........................ None
   See application file for complete search history.

(56) References Cited

U.S. PATENT DOCUMENTS

| | | | |
|---|---|---|---|
| 4,775,576 | A | 10/1988 | Bouchand et al. |
| 5,851,643 | A | 12/1998 | Honda et al. |
| 6,280,813 | B1 | 8/2001 | Carey et al. |
| 6,372,330 | B1 | 4/2002 | Do et al. |
| 6,567,236 | B1 | 5/2003 | Doerner et al. |
| 6,650,513 | B2 | 11/2003 | Fullerton et al. |
| 6,821,652 | B1 * | 11/2004 | Okamoto et al. ......... 428/828.1 |
| 2002/0098390 | A1 | 7/2002 | Do et al. |
| 2003/0022023 | A1 | 1/2003 | Carey et al. |
| 2003/0035973 | A1 | 2/2003 | Trindade et al. |
| 2003/0104247 | A1 | 6/2003 | Girt |
| 2004/0053073 | A1 | 3/2004 | Lu et al. |
| 2004/0053078 | A1 | 3/2004 | Kikitso et al. |
| 2004/0058197 | A1 | 3/2004 | Nakamura et al. |
| 2004/0137278 | A1 | 7/2004 | Uwazumi et al. |

FOREIGN PATENT DOCUMENTS

| | | |
|---|---|---|
| JP | 2216611 | 8/1990 |
| JP | 2002288820 | 10/2002 |

OTHER PUBLICATIONS

Girt, E; Richter, J., Antiferromagnetically Coupled Perpendicular Recording Media, IEEE Transactions on Magnetics, vol. 39, No. 5, Sep. 2003.

* cited by examiner

*Primary Examiner*—Kevin M Bernatz
(74) *Attorney, Agent, or Firm*—G. Martin Knight

(57) ABSTRACT

The invention uses an upper and lower magnetic layer of a laminated magnetic layer structure that includes an AF spacer layer that results in weak antiferromagnetic coupling of the magnetic layers that is insufficient to cause either of the layers to switch so that the magnetic orientations of the two ferromagnetic layers remain parallel. An advantage of the invention is that the AF-coupling tends to anti-correlate the noise in the two layers. The weak AF coupling according to the invention is believed to act at the transition boundaries in the media to cause some of the noise domains to be oriented antiparallel and the noise to be less correlated than would be the case without the AF coupling and thereby to achieve improved SNR.

10 Claims, 2 Drawing Sheets

LAMINATED MAGNETIC THIN FILMS WITH WEAK ANTIFERROMAGNETIC COUPLING FOR PERPENDICULAR MAGNETIC RECORDING

RELATED APPLICATIONS

Co-pending, commonly assigned application bearing Ser. No. 10/628,011 filed on Jun. 11, 2003 describes a laminated antiferromagnetically coupled magnetic recording medium for longitudinal recording with three magnetic layers separated by two nonmagnetic spacer layers with the middle and bottom layers being antiferromagnetically coupled, and the upper magnetic layer having a higher magnetic anisotropy than the middle magnetic layer. The magnetic anisotropy can be adjusted by primarily by changing the platinum content versus the cobalt content of a cobalt based magnetic alloy such as CoPtCr or CoPtCrB. The magnetization can be adjusted by altering the chromium and/or the boron content versus the cobalt content. Lowering the chromium content and increasing the cobalt content increases the magnetization.

FIELD OF THE INVENTION

The invention relates to magnetic thin film media with laminated or antiferromagnetically coupled ferromagnetic layers and more particularly to methods for coupling and decoupling ferromagnetic thin films in such media for perpendicular recording.

BACKGROUND OF THE INVENTION

A typical prior art head and disk system 10 is illustrated in block form in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

The conventional disk 16 for longitudinal recording includes substrate 26 of glass or AlMg with an electroless coating of NiP that has been highly polished. The thin films 21 on the disk 16 typically include a chromium or chromium alloy underlayer and at least one ferromagnetic layer based on various alloys of cobalt, platinum and chromium. Additional elements such as tantalum and boron are often used in the magnetic alloy. A protective overcoat layer is used to improve wearability and corrosion resistance. Various seed layers, multiple underlayers and multilayered magnetic films have all been described in the prior art. Laminated magnetic films include multiple ferromagnetic layers that are substantially decoupled. Seed layers are used with nonmetallic substrate materials such as glass. Typically the seed layer is a relatively thin crystalline film which is the first layer deposited on the substrate. Materials proposed for use as seed layers include chromium, titanium, tantalum, MgO, tungsten, CrTi, FeAl, NiAl and RuAl. The use of pre-seed layers is relatively recent practice. The pre-seed layer is a non-crystalline thin film which provides a base for growing the subsequent crystalline films that is superior to the substrate for this purpose.

Many approaches have been described to improve the media signal to noise ratio (SNR) in magnetic recording media for longitudinal recording. Recently there has been a focus of perpendicular recording techniques and media which are believed to provide certain advantages over longitudinal recording. The migration of concepts from longitudinal to perpendicular recording is not always straightforward. In the following some of the prior art techniques applicable to longitudinal recording will be described. These techniques often require changing the composition of the magnetic alloy or underlayer, or manipulating the process conditions to achieve the desired microstructure. Another well-established technique for improving media SNR in longitudinal recording is by laminating two or more magnetic media layers separated by non-magnetic interlayers. Laminated structures are thought to work best if the two magnetic layers are magnetically uncorrelated and act as independent noise sources. If this holds for two magnetic layers, a 3-dB gain in SNR is expected for the laminated structure as compared to the signal film. This improvement has been described in detail for longitudinal AFC media in U.S. Pat. No. 6,372,330 to Do, et al. This improvement in SNR was achieved in these films without a degradation of other recording performance parameters. The use of lamination for noise reduction has been extensively studied to find the favorable spacer layer materials, including Cr, CrV, Mo and Ru, and spacer thicknesses, from a few angstroms upward, that result in the best decoupling of the magnetic layers and the lowest media noise.

However, the applicability of laminated media in longitudinal recording is limited by thermal stability concerns. As the densities of magnetic storage increase, Mrt (the product of the remanent magnetization and the medium thickness) has decreased and the coercive fields $H_c$ have increased. To achieve this reduction in Mrt, the thickness t can be reduced, but only to a limit. Magnetic media often exhibit (i) decreasing coercive fields and (ii) increasing magnetic decay with decreasing film thickness. These phenomena have been attributed to thermal activation of small magnetic grains or small regions of magnetization (the superparamagnetic effect). The stability of the magnetic media is proportional to KuV, where Ku is the magnetic anisotropy constant of the media and V is the volume of the magnetic grain. As the media thickness is decreased, V also decreases. If the film thickness is too thin, the stored magnetic information is no longer stable in normal hard-drive operating conditions. In conventional laminated media, these problems are exacerbated. For a given Mrt of the composite film structure, each layer will have half the Mrt/2 and, therefore, the onset of the superparamagnetic effect occur for larger Mrt values. Laminated AFC improves this situation but is still limited by thermal stability concerns.

One approach to the solution of this problem is to use a higher anisotropy material, i.e. one with a higher $K_u$. However, the increase in $K_u$ is limited by the point where the coercivity $H_c$, which is approximately equal to $K_u/M_r$, becomes too great to be written by a practical write heads. A similar approach is to reduce the $M_r$ of the magnetic layer for a fixed layer thickness, but this is also limited by the coercivity that can be written. Another solution is to increase the intergranular exchange, so that the effective magnetic volume V of the magnetic grains is increased. However, this approach has been shown to be deleterious to the intrinsic signal-to-noise ratio (S0NR) of the magnetic layer.

In U.S. Pat. No. 6,280,813 to Carey, et al., a layer structure for longitudinal recording is described that includes at least two ferromagnetic films antiferromagnetically coupled (AFC) together across a nonferromagnetic coupling/spacer film. The antiferromagnetic coupling is designed to be strong enough to ensure that the layer magnetizations are antiparallel in the remanent state. Antiferromagnetic coupling (AFC) maintains stability of the media with reductions in $M_r t$. In general, the exchange coupling oscillates from ferromagnetic to antiferromagnetic with increasing coupling/spacer film thickness and that the preferred 6 angstrom thickness of the ruthenium coupling/spacer layer was selected because it corresponds to the first antiferromagnetic peak in the oscillation for the particular thin film structure. Materials that are appropriate for use as the nonferromagnetic coupling/spacer films include ruthenium (Ru), chromium (Cr), rhodium (Rh), iridium (Ir), copper (Cu), and their alloys. Because the magnetic moments of the two antiferromagnetically coupled films are oriented antiparallel, the net remanent magnetization-thickness product ($M_r t$) of the recording layer is the difference in the $M_r t$ values of the two ferromagnetic films. An embodiment of the structure includes two ferromagnetic CoPtCrB films, separated by a Ru spacer film having a thickness selected to maximize the antiferromagnetic exchange coupling between the two CoPtCrB films. The top ferromagnetic layer is designed to have a greater $M_r t$ than the bottom ferromagnetic layer, so that the net moment in zero applied magnetic field is low, but nonzero. The Carey '813 patent also states that the antiferromagnetic coupling is enhanced by a thin (5 Angstroms) ferromagnetic cobalt interface layer added between the coupling/spacer layer and the top and/or bottom ferromagnetic layers. The patent mentions, but does not elaborate on the use CoCr interface layers.

In U.S. Pat. No. 6,567,236 to Doerner, et al. (May 20, 2003) an antiferromagnetically coupled layer structure is described for longitudinal magnetic recording wherein the top ferromagnetic structure is a bilayer structure including a relatively thin first sublayer of ferromagnetic material in contact with the coupling/spacer layer. The first sublayer has a higher magnetic moment than the second sublayer. The second sublayer has a lower magnetic moment and is much thicker than the first sublayer with a composition and thickness selected to provide the $M_r t$ when combined with first sublayer that is needed for the overall magnetic structure. A preferred embodiment of a layer structure according to the patent is a pre-seed layer of CrTi; a seed layer of RuAl; an underlayer of CrTi; a bottom ferromagnetic layer of CoCr; an AFC coupling/spacer layer of Ru; and a top ferromagnetic structure including: a thin first sublayer of CoCr, CoCrB or CoPtCrB, and a thicker second sublayer of material of CoPtCrB with a lower moment than the first sublayer.

Published US patent application 2002/0098390 by H. V. Do, et al., describes a laminated medium for longitudinal magnetic recording that includes an antiferromagnetically coupled (AFC) magnetic layer structure and a conventional single magnetic layer. The AFC magnetic layer structure has a net remanent magnetization-thickness product ($M_r t$) which is the difference in the $M_r t$ values of its two ferromagnetic films. The type of ferromagnetic material and the thickness values of the ferromagnetic films are chosen so that the net moment in zero applied field will be low, but nonzero. The $M_r t$ for the media is given by the sum of the $M_r t$ of the upper magnetic layer and the $M_r t$ of the AF-coupled layer stack. This allows control of the $M_r t$ independently from either $M_r$ or t. Alternatively, the magnetization (the magnetic moment per unit volume of material) of the two ferromagnetic films may be made different by using different ferromagnetic materials for the two. In a laminated medium each of the magnetic layers contributes to the readback signal; therefore, the net magnetic moment of the AFC layer stack must be non-zero. The nonferromagnetic spacer layer between the AFC layer and the single ferromagnetic layer has a composition and thickness to prevent substantial antiferromagnetic exchange coupling. The laminated medium has improved thermal stability from the antiferromagnetic coupling and reduced intrinsic media noise from the lamination.

SUMMARY OF THE INVENTION

The preferred embodiment of media according to the invention is for perpendicular recording. The invention uses an upper and lower magnetic layer of a laminated magnetic layer structure that includes a spacer layer that results in weak antiferromagnetic (AF) coupling of the magnetic layers that is insufficient to cause either of the layers to switch so that the magnetic orientations of the two ferromagnetic layers remain parallel. The anisotropy and coercivity of the two magnetic layers is selected so that the antiparallel coupling field is insufficient to cause the domains to switch. This is in contrast to prior art AFC media where magnetic layers are selected to ensure that one of the two ferromagnetic layers will be switched by the AFC field and will be oriented antiparallel to the other in remanence. An advantage of the invention is that the AF-coupling tends to anti-correlate the noise in the two layers. The benefit of longitudinal laminated media is due to the noise in the two layers being uncorrelated. Some or all of this benefit is lost when the magnetic layers have perpendicular orientations where the strong dipolar fields tend to correlate the noise in the two layers. The weak AF coupling according to the invention is believed to act at the transition boundaries in the media to cause some of the noise domains to be oriented antiparallel and the noise to be less correlated than would be the case without the AF coupling and thereby to achieve improved SNR.

DETAILED DESCRIPTION OF THE INVENTION AND THE PREFERRED EMBODIMENTS

Figure 1:
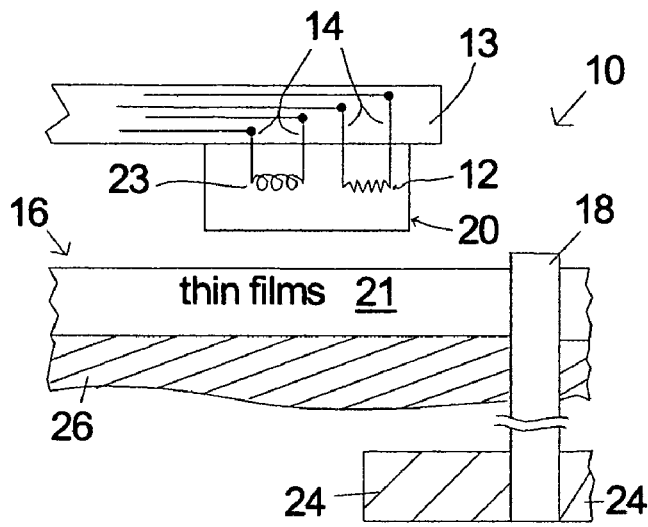
FIG. 1 is a symbolic illustration of the prior art showing the relationships between the head and associated components in a disk drive.

Perpendicular recording is thought to have thermal stability advantages when compared to longitudinal recording because of higher write fields and thicker media. The preferred anisotropy orientation of magnetic films for perpendicular recording is perpendicular to the plane of the thin film. Laminated magnetic films for longitudinal recording have the dipolar fields predominantly oriented in the plane of the films where the interlayer dipole fields tend to favor an antiparallel configuration. However, in perpendicular recording media the dipolar fields from one of the laminated layers acts on the other layer and tend to ferromagnetically align or correlate the magnetization. Thus, even if a spacer layer is chosen such that there is no exchange (e.g. RKKY) between the two layers, the dipolar fields will tend to correlate the magnetic domains including the noise and limit the potential 3-dB gain otherwise available in longitudinal laminated media.

In the invention a laminated magnetic structure designed for perpendicular recording includes a spacer layer that provides antiferromagnetic (AF) coupling between the two layers. This is unlike the prior art design of a laminated magnetic structure which includes a spacer layer selected to achieve decoupling of the two magnetic layers. The properties of the upper and lower magnetic layers are chosen to establish the condition that the AF-coupling is weak enough so that the two layers remain parallel after writing. The anisotropy, coercivity and thickness of the two magnetic layers is selected so that the antiparallel coupling field is insufficient to cause the domains to switch. The remanent state of magnetization of the two magnetic layers according to the invention is parallel. This is in contrast to the prior art AFC media where magnetic layers are selected to ensure that one of the two ferromagnetic layers will be switched by the AFC field and will be oriented antiparallel to the other.

An advantage of the structure according to the invention is that the AF-coupling tends to anti-correlate the noise in the two layers (that is, it tends to cause some noise domains in the two layers to be antiparallel) and acts to counter the dipolar coupling which tends to correlate the two layers. The benefit of longitudinal laminated media is due to the noise in the two layers being uncorrelated. Some or all of this benefit is lost when the magnetic layers have perpendicular orientations which tend to result in correlation of the noise in the two layers. The relatively weak AF coupling according to the invention is believed to act at the transition boundaries in the media to cause the noise to be less correlated than would be the case without the AF coupling. The dipolar coupling tends to correlate the two layers while the AF-coupling tends to anti-correlate the two layers. Thus, the invention makes it is possible to tune these two interactions so that the effective dipolar interaction between the two layers tends to be cancelled at transition boundaries and achieve improved SNR.

In laminated media the $H_0$ of both the upper and lower layers need to be simultaneously matched to the head field due to the fact that they are substantially independent. The invention preferably maintains the independence of the two layers. The anisotropy, coercivity and thickness of the two magnetic layers are selected so that the antiparallel coupling field is insufficient to cause the domains to switch and to maximize the SNR. Micromagnetic modeling and empirical testing can be used to optimize the SNR. Since the media is for perpendicular recording the preferred anisotropy orientation is perpendicular to the plane of the thin film. When the head field writes the transition in the media, the two domains of the two magnetic layers will primarily be parallel. The coercivity of each of the magnetic layers is designed to be high enough that the antiferromagnetic coupling field across the spacer layer is insufficient to cause the domains in either of the magnetic layers to switch to an antiparallel state in the remanent state when the head field is removed.

Figure 2:
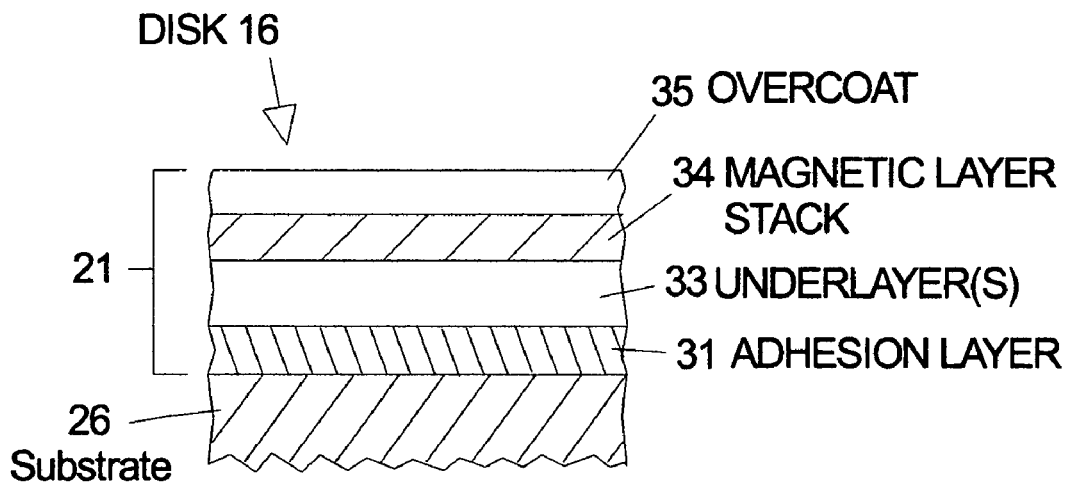
FIG. 2 is an illustration of a prior art layer structure for a magnetic thin film disk with which the magnetic layer stack of the invention can be used.

FIG. 2 illustrates a prior art layer structure 21 of a thin film magnetic disk 16 in which the layer stack according to the invention can be used. The substrate 26 is commonly AlMg/NiP or glass. An optional adhesion layer 31 can be deposited under the underlayer stack 33. Media for perpendicular recording typically include a magnetically soft underlayer layer in the underlayer stack 33. The layer structure shown in FIG. 2 can be used with a variety of magnetic layer stacks 34. The magnetic layer stack 34 is composed of a plurality of layers in the prior art including laminated and AF-coupled forms.

Figure 3:
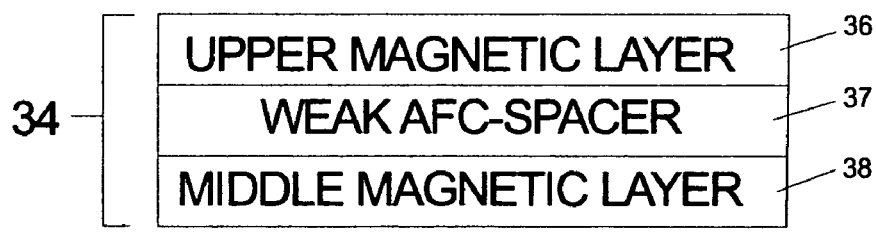
FIG. 3 is an illustration of a first embodiment of a magnetic layer stack for a magnetic thin film disk according to the invention.

FIG. 3 illustrates a layer stack 34 according to the invention. The layer stack 34 shown is a laminated, weakly antiferromagnetically coupled structure including an upper magnetic layer 36 (the magnetic layer nearest the surface of the disk and, therefore, the head), a weak AFC-spacer layer 37 and a lower magnetic layer 38. The weak AFC spacer 37 is preferably ruthenium, but any prior art spacer material used for AF-coupling can be used. The weak AFC spacer layer 37 is selected to provide some AF-coupling of the upper and lower magnetic layers, but not enough to cause the orientations to be anti-parallel.

The weak AFC spacer layer 37 is a nonmagnetic material with a thickness that is selected to weakly antiferromagnetically couple the top magnetic layer with the lower magnetic layer. Ruthenium is the preferred material for the spacer layer 37, but the prior art indicates that suitable materials include chromium (Cr), rhodium (Rh), iridium (Ir), copper (Cu), and their alloys. The AF-coupling field is not expected to rotate the orientations significantly. The AFC spacer can be selected according to the prior art principles for AFC media. The magnetic layers used in media according to the invention will be different than those in AFC media, however. A range of thicknesses from approximately 4 to 8 angstroms is a reasonable thickness for an AFC spacer layer of ruthenium.

The upper and lower magnetic layer are ferromagnetic material of the type used in the prior art of thin film disks for perpendicular recording. Examples of suitable materials include CoPtCr alloys with oxide segregants, e.g. SiOx, AlOx, TiOx, MgO, TaOx. In a preferred embodiment the upper and lower magnetic layers are substantially the same.

The method of operating a disk drive according to the invention is described as follows. The field generated by the write head acts to orient a set of domains in parallel in each magnetic layer corresponding to a bit of information. At the boundary of the set of domains corresponding to the bit there will be a set of noise domains which are not oriented as desired in part because the head field decreases at the edges. During the writing process, the antiferromagnetic coupling field in the media according to the invention will have no effect where the head field is strong, but in the boundary region where the head field is weak, the antiferromagnetic coupling field will be sufficiently strong to cause some of the noise domain pairs to be oriented antiparallel during the write process.

Figure 4:
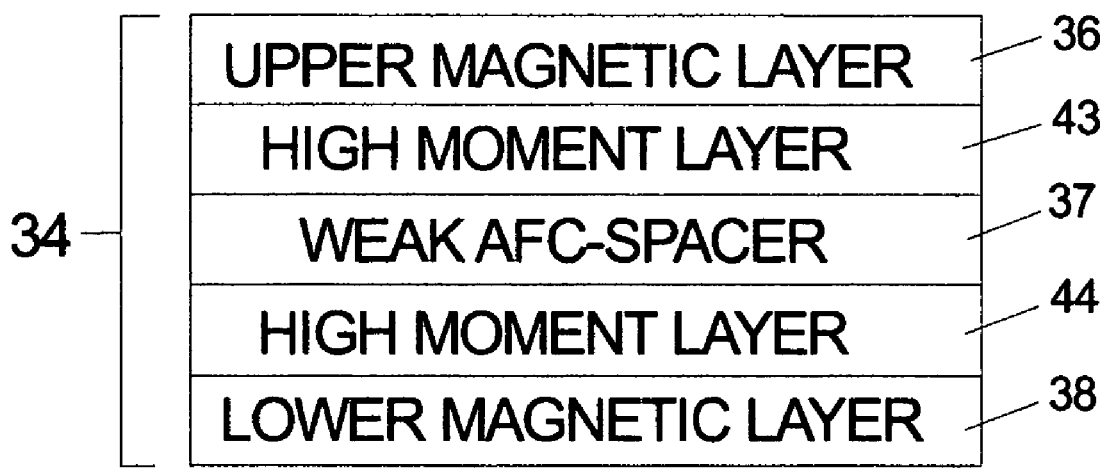
FIG. 4 is an illustration of a second embodiment of a magnetic layer stack for a magnetic thin film disk according to the invention with optional high moment magnetic films adjacent to the spacer layer.

In an alternative embodiment shown in FIG. 4 the antiferromagnetic coupling can be enhanced by adding a thin (5 Angstroms for example) high moment magnetic interface layer 43, 44 added between the coupling/spacer layer and the top and/or bottom ferromagnetic layers.

Figure 5:
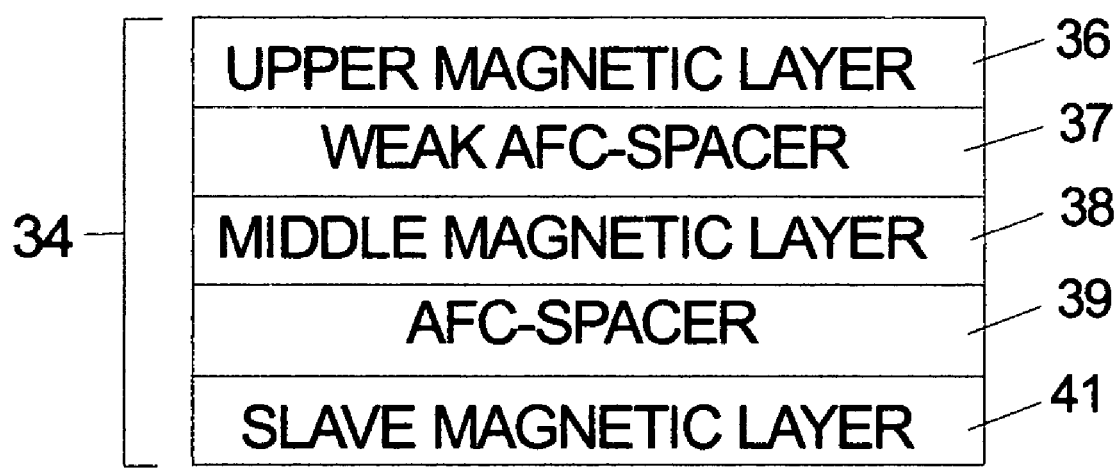
FIG. 5 is an illustration of a third embodiment of a magnetic layer stack for a magnetic thin film disk according to the invention using the laminated layer structure in an AF-coupled magnetic structure.

FIG. 5 is an illustration of a laminated, antiferromagnetically coupled magnetic layer stack for a magnetic thin film disk according to a second embodiment of the invention. In the second embodiment the laminated layer structure according to the invention is used in an AFC structure which has an AFC spacer layer 39 and a slave magnetic layer 41. The slave layer 41 switches magnetic orientation as a result of coupling with the magnetic layers above it, so it is not written directly by the head field.

Micromagnetic simulation was performed for two perpendicular media: one with a decoupling spacer layer and one with a spacer layer achieving weak AF-coupling. The layers in the models were as follows:

TABLE 1

| Sample 1 | Media according to the Invention |
| --- | --- |
| Top Magnetic Layer 12-20 nm | Top Magnetic Layer 12-20 nm |
| Decoupling Spacer 1-4 nm | AF-coupling Spacer 1-4 nm |
| Bottom Magnetic Layer 12-22 nm | Bottom Magnetic Layer 12-22 nm |
| Growth Layer 5-40 nm | Growth Layer 5-40 nm |
| Soft Underlayer 100-300 nm | Soft Underlayer 100-300 nm |

A number of transitions were "written" in the media and the position of the transitions in the top and bottom magnetic layers were determined. The results of the simulation showed that position of the transitions in the top and bottom magnetic layers in sample 1 tended to be correlated which confirmed that laminated layers, at least in this model, were not going to provide SNR improvement. In contrast the media according to the invention showed a much more random relationship between the position of the transition in the top and bottom magnetic layer which in turn leads to improved SNR. In general, the SNR improvement in simulations of the media according to the invention was from 0.9 to 3.0 dB depending on the specific thicknesses of the various layers in the ranges specified in the table.

The thin film structures described above can be formed using standard thin film deposition techniques. The films are sequentially deposited with each film being deposited on the previous film. The atomic percent compositions given above are given without regard for the small amounts of contamination that invariably exist in sputtered thin films as is well known to those skilled in the art. The invention has been described with respect to particular embodiments, but other uses and applications for the invention will be apparent to those skilled in the art.

The invention claimed is:

1. A thin film magnetic recording medium for perpendicular recording comprising:
   a first thin film magnetic layer with a preferred anisotropy orientation perpendicular to a plane of the thin film, the first thin film magnetic layer having at least a first set of magnetic domains recording a first bit of information and a first set of noise domains adjacent to the first set of magnetic domains;
   a second thin film magnetic layer with a preferred anisotropy orientation perpendicular to a plane of the thin film, the second thin film magnetic layer being nearer to a surface of the recording medium than the first thin film magnetic layer, the second thin film magnetic ayer having a second set of magnetic domains recording the first bit of information and having a remanent state of magnetization parallel to a remanent state of magnetization of the first set of magnetic domains in the first thin film magnetic layer, and having a second set of noise domains adjacent to the second set of magnetic domains; and
   a spacer layer separating the first and second thin film magnetic layers that achieves an antiferromagnetic coupling field between the first and second thin film magnetic layers, the antiferromagnetic coupling field being insufficient to cause the first and second sets of magnetic domains to switch to antiparallel states in a remanent state, and the antiferromagnetic coupling field decreasing a correlation between first and second sets of noise domains, relative to structure without said antiferromagnetic coupling field.

2. The thin film magnetic recording medium of claim 1 further comprising a thin film of a high moment magnetic material adjacent to the spacer layer, the thin film of a high moment magnetic material having a higher moment than the first magnetic layer.

3. The thin film magnetic recording medium of claim 1 further comprising first and second thin films of high moment magnetic material adjacent to the spacer layer and disposed to separate the spacer layer from the first and second magnetic layers, the high moment magnetic material having a higher moment than the first magnetic layer.

4. The thin film magnetic recording medium of claim 1 further comprising an antiferromagnetic coupling layer below the first thin film magnetic layer and a slave magnetic below the antiferromagnetic coupling layer.

5. The thin film magnetic recording medium of claim 1 wherein the antiferromagnetic coupling field between the first and second thin film magnetic layers acts to increase a media SNR by reducing correlation between first and second sets of noise domains in the first and second thin film magnetic layers.

6. A disk drive comprising:
   a magnetic transducer including a read and a write head positionable to read and write sets of magnetic domains on a magnetic thin film disk; and
   the magnetic thin film disk including:
   a first thin film magnetic layer with a preferred anisotropy orientation perpendicular to a plane of the thin film;
   a second thin film magnetic layer with a preferred anisotropy orientation perpendicular to a plane of the thin film, the second thin film magnetic layer being nearer to a surface of the recording medium than the first thin film magnetic layer; and
   a spacer layer separating the first and second magnetic layers to achieve an antiferromagnetic coupling field between the first and second magnetic layers, the antiferromagnetic coupling field being insufficient to cause sets of magnetic domains written by the magnetic transducer in the first or second magnetic layers to switch to antiparallel states in a remanent state, and the antiferromagnetic coupling field being sufficient to decrease a correlation between noise domains in the first and second thin film magnetic layers, relative to a structure without said antiferromagnetic coupling field.

7. The disk drive of claim 6 wherein the thin film magnetic recording medium further comprises a thin film of a high moment magnetic material adjacent to the spacer layer, the thin film of a high moment magnetic material having a higher moment than the first magnetic layer.

8. The disk drive of claim 6 wherein the thin film magnetic recording medium further comprises first and second thin films of high moment magnetic material adjacent to the spacer layer and disposed to separate the spacer layer from the first and second magnetic layers, the high moment magnetic material having a higher moment than the first magnetic layer.

9. The disk drive of claim 6 wherein the thin film magnetic recording medium further comprises an antiferromagnetic coupling layer below the first thin film magnetic layer and a slave magnetic below the antiferromagnetic coupling layer.

10. The disk drive of claim 6 wherein the antiferromagnetic coupling field between the first and second thin film magnetic layers acts to increase a media SNR by reducing correlation between noise domains in the first and second thin film magnetic layers.

* * * * *